United States Patent [19]

Kudo et al.

[11] 3,883,615
[45] May 13, 1975

[54] FLAME-RETARDANT IMPACT-RESISTANT RESIN COMPOSITION

[75] Inventors: Teizo Kudo; Shinji Tokuhara; Keiichi Chata, all of Saitama, Japan

[73] Assignee: Daicel Ltd., Higashi-ku, Osaka, Japan

[22] Filed: Aug. 13, 1973

[21] Appl. No.: 388,052

[30] Foreign Application Priority Data
Aug. 24, 1972 Japan.............................. 47-84830

[52] U.S. Cl....... 260/876 R; 260/45.75 K; 260/879; 260/880 R
[51] Int. Cl......................... C08f 15/00; C08f 19/00
[58] Field of Search.............................. 260/876 R

[56] References Cited
UNITED STATES PATENTS

| | | | |
|---|---|---|---|
| 3,271,333 | 9/1966 | Eichorn | 260/892 |
| 3,494,982 | 2/1970 | Grabowski | 260/876 R |
| 3,496,251 | 2/1970 | Takahashi | 260/876 R |
| 3,642,948 | 2/1972 | Bauer | 260/876 R |

*Primary Examiner*—Paul Lieberman
*Attorney, Agent, or Firm*—Woodhams, Blanchard and Flynn

[57] ABSTRACT

A flame-retardant, impact-resistant resin is prepared by copolymerizing rubber and resin constituents of a high impact resin, said resin constituent containing 15 to 35 percent by weight of acrylic or methacrylic acid ester of halogencontaining phenyl derivative, to form a copolymer and then mixing with said copolymer from 10 to 20 parts by weight, per 100 parts of said copolymer, of chlorinated polyethylene having a chlorine content of 25 to 45 percent by weight.

5 Claims, No Drawings

FLAME-RETARDANT IMPACT-RESISTANT RESIN COMPOSITION

BACKGROUND OF THE INVENTION

1. Field of the Invention

This invention relates to flame-resistant, self-extinguishing thermoplastic resin compositions which possess high impact strength and which are highly useful in the manufacture of molded products apt to be exposed to ignition conditions during handling, storage or use.

2. Description of the Prior Art

Impact-resistant styrene resins such as HI (high impact) polystyrene and ABS (acrylonitrile-butadiene-styrene) resin are used for construction materials, motorcar parts, domestic electric appliances and many other molded articles in various fields. However, like many other synthetic high molecular weight resin materials, impact-resistant styrene resins are easily flammable and the danger of fire is great. Various means of imparting flame-resistance to synthetic high molecular weight resin materials have been proposed. Roughly these means can be divided into two methods, i.e. (1) a method in which an incombustible or extinguishing compound (a so-called flame-retarding agent) is simply blended in the synthetic high molecular weight resin materials and (2) a method in which an incombustible or extinguishing compound is copolymerized or copolycondensed with the synthetic high molecular weight resin materials. The former method is employed more frequently. However, in both methods, even though the desired flame-retarding effect can be obtained, other desired properties of the synthetic resin frequently are unfavorably influenced, because the incombustible or extinguishing compound introduced therein contains chlorine or bromine in many cases.

In particular, in the flame retarding treatment of HI polystyrene or ABS resin, the principal properties (i.e. impact resistance and thermal stability during the molding procedure) tend to be impaired by the former method wherein an incombustible or flame-retarding compound is blended in the resin.

If a flame-retarding agent of low molecular weight is used, other problems such as a lowering of the deflection temperature under heat, generation of corrosive gases in the course of the molding operation, toxicity of substances exuded from the resin during use over a long period of time and decreased durability of the fire resistant property will occur, in addition to the above described problem.

In the latter method of flame retarding by copolymerization, halogen-containing unsaturated compounds are used as the flame-retarding comonomers. The halogen-containing unsaturated monomers actually used at present are few in number. They include, for example, vinyl chloride, vinylidene chloride, α-chloroacrylonitrile, α-chlorostyrene and 2,3-dibromopropyl methacrylate.

In the copolymerization type of flame-retarding treatment of impact-resistant styrene resins, the degree of copolymerization reactivity of the flame-retarding monomer with the principal monomer such as styrene or acrylonitrile must be taken into consideration. If this requirement is not satisfied, it is difficult to obtain a sufficient copolymerization velocity or a copolymer resin of relatively homogeneous composition.

Further, the influence of the flame-retarding monomer upon graft reactivity and cross linking reactivity of the rubber component must also be considered. In practice, it is very difficult to obtain both the flame-retarding property and the other desirable physical properties of the impact-resistant resin.

Thus, impact-resistant, rubber-modified styrene resins having both satisfactory flame-retarding property and satisfactory other desirable physical properties have not yet been developed.

We previously found that rubber-modified styrene resin compositions having both impact-resistant and flame-retarding properties can be obtained by incorporating therein an acrylic or methacrylic acid ester of a halogen-containing phenol derivative as a polymer component.

However, the flame-retarding resins according to our prior invention belong to the SE-II group in the burning test which will be described below. Namely, small molten drops of the resin fall during the burning test to cause "burning drips". Therefore, the scope of use is limited in the practical utilization of this prior resin composition.

The inventors have achieved the present invention after intensive investigations on eliminating said "burning drips" and providing impact-resistant, rubber-modified styrene resins having excellent flame retarding properties.

According to the invention described and claimed in the following, the critical distinction between a resin composition that has the dangerous and impractical property of SE-II and one that has the desirable SE-I property will be manifested.

SUMMARY OF THE INVENTION

The present invention provides a flame-retardant, impact-resistant resin composition having a non-dripping property which comprises (A) 100 parts by weight of an impact-resistant styrene resin obtained by copolymerizing the constituents of an impact resistant styrene-type resin with a first flame retardant compound, i.e. an acrylic or methacrylic acid ester of a halogen-containing phenol, said resin having incorporated therein as a second flame retardant compound, (B) 10 to 20 parts by weight of a chlorinated polyethylene having a chlorine content of 25 to 45 wt. percent.

A method of imparting flame-retarding properties to a rubber-modified impact-resistant styrene resin by incorporating therein a chlorinated polyethylene alone has already been developed. However, if the flame-retarding treatment is effected with the chlorinated polyethylene component alone, a considerable amount of such chlorinated polyethylene is required and, consequently, the excellent mechanical properties of the impact-resistant styrene resin, particularly its heat resistance, hardness and excellent molding property, are seriously impaired.

According to the present invention, however, the resin composition comprising (A) an impact-resistant, rubber-modified styrene copolymer resin containing as a first flame retardant component, acrylic or methacrylic acid ester of a halogen-containing phenol derivative as a polymer component, said resin having incorporated therein as a second flame retardant component, (B) a chlorinated polyethylene, requires the use of only a small amount of the chlorinated polyethylene owing to a synergistic relationship between the two flame-retarding components. Moreover, the intrinsic mechanical properties of the impact-resistant styrene resin such as impact strength and deflection temperature under heat, and, further, heat stability during the molding operation are not impaired at all.

The flame-retardant, impact-resistant resin composition, according to the present invention, consists essentially of A. 100 parts by weight of rubber-modified copolymer consisting essentially of (a) rubber component and (b) resin component, the rubber component (a) being from 3 to 30 percent by weight of the sum of (a) plus (b), the resin component (b) being from 97 to 70 percent by weight of the sum of (a) plus (b), said resin component (b) consisting of 1. at least 40 percent by weight of (b) of aromatic monoalkenyl compound,
2. from 15 to 35 percent by weight of (b) of acrylic or methacrylic acid ester of a halogen-containing phenol derivative of the formula set forth below, and
3. the balance of an ethylenically unsaturated monomer copolymerizable with said aromatic monoalkenyl compound, admixed with, B. from 10 to 20 parts by weight of chlorinated polyethylene having a chlorine content of 25 to 45 percent by weight.

The acrylic or methacrylic acid ester of a halogen-containing phenol derivative (ingredient A (b) (2), above) has the formula:

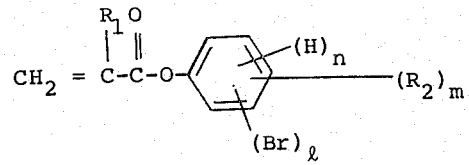

wherein
$R_1$ is H or $CH_3$,
$R_2$ is alkyl of one to 4 carbon atoms or chlorine,
$l$ is an integer of 2, 3, 4 or 5, and
$m$ and $n$ each is an integer of 0, 1, 2 or 3,
with the proviso that the sum of $l+m+n$ must be 5. These esters can be obtained by reacting a halogen-containing phenol derivative with acrylic acid chloride or methacrylic acid chloride, as described, for example, in U.S. Ser. No. 206,934, filed Dec. 10, 1971, the contents of which are incorporated herein by reference.

If the amount of said ester A (b) (2) in the component A(b) is less than 15 wt. percent, the complete composition comprising such copolymer and the chlorinated polyethylene does not belong to the self-extinguishing group in a burning test according to the UL Standard which will be described below. Thus, although some retardance in the burning velocity is observed, a sufficient fire resistant property cannot be obtained. In general, a larger quantity of a flame-retarding component is required in the flame-retarding treatment if the burning drips are not to occur as compared with a case wherein the burning drips do occur. On the other hand, the use of the ester A (b) (2) in an amount of more than 35 wt. percent, based on the weight of component A(b), is disadvantageous from an economical viewpoint, because such a large quantity is not required for the flame-retarding treatment. Moreover, the thermal resistance during the molding process is reduced, or sometimes coloring is caused in such a case.

The rubber component A (a) and (1) and (3) of the resin component A (b) of copolymer A can be selected from the known materials used to make high-impact styrene-type and ABS-type resins.

The preferred aromatic monoalkenyl compound is styrene. Styrene derivatives containing from 1 to 3 lower alkyl substituents on the benzene ring or vinyl group, such as α-methyl styrene, dimethylstyrene, dibutylstyrene and vinyltoluene are also suitable. Mixtures of aromatic monoalkenyl compounds can be used. The aromatic monoalkenyl compound or mixture thereof comprise at least 40 wt. percent of the resin component A (b) of the copolymer. The resin component A (b) can consist entirely of aromatic monoalkenyl compound or mixture thereof and said ester A(b) (2). Alternatively, a mixture consisting of 40 wt. percent or more of the aromatic monoalkenyl compound, 15 to 35 wt. percent of said ester A(b) (2) and the balance being another monomer or monomers copolymerizable therewith, can be employed as ingredient A(b). For example, the aromatic monoalkenyl compound can be used in the form of a mixture with acrylonitrile, methyl methacrylate or the like. Other polymerizable compound(s) having a <C=C> group can be used as comonomers with the aromatic monoalkenyl compound, in accordance with conventional practice.

The rubber component A(a) can be selected from those generally used in the preparation of impact-resistant resins. Rubber components containing butadiene as a main ingredient are suitable, such as polybutadiene or styrene-butadiene copolymers, but this is not limiting. The rubber component A(a) is contained in the final composition in the form of a graft copolymer with one or more of the polymerizable compounds of said resin component A(b). As for the amount of the rubber component A (a), the impact resistance is insufficient if the amount thereof, based on the sum of rubber component A(a) and resin component A(b), is less than 3 wt. percent and the physical properties other than impact resistance are insufficient if said amount is larger than 30 wt. percent.

The impact-resistant rubber-modified copolymer resin of the invention can be prepared by graft-copolymerizing a mixture of reactive ingredients A(a) and A(b). Alternatively the ingredients of the resin component A(b) can be copolymerized, in the absence of ingredient A(a). The resulting copolymer can then be mixed with a quantity of second copolymer of ingredients A(a) and A(b), (1) or (1) plus (3), such as HI polystyrene and ABS resin, whereby the resulting mixture of the two copolymers contains the specified amounts of ingredients A(a), A(b), (1), (2) and (3).

The chlorinated polyethylene, i.e. the second component (B) of the invention, is prepared by chlorinating polyethylene, ethylene-propylene copolymer, or ethylene-butene copolymer in a conventional manner. The chlorine content is from 25 to 45 wt. percent. Preferably, the distribution of combined chlorine in the polymer is uniform, and the presence of residual crystals which impair the rubber property is minimized therein. Chlorosulfonated polyethylenes such as Hypalon (a trade mark of E. I. du Pont de Nemours & Co. Inc., U.S.A.) are also included in the chlorinated polyethylenes. Preferred chlorinated polyethylenes are those of the so-called rubbery form having a molecular weight of from 1000 to several millions. Chlorinated polyethylenes having a molecular weight of more than 10,000 are preferred. If the chlorine content of the chlorinated polyethylenes is less than 25 wt. percent, the impact strength of the final composition obtained by mixing the chlorinated polyethylene with the impact-resistant, rubber modified copolymer resin is insufficient. On the other hand, if the chlorine content exceeds 45 wt. percent, the impact resistance is also lowered and, moreover, the workability is reduced and coloring is increased. If more than 20 parts of the chlorinated polyethylene is incorporated, per 100 parts of the impact-resistant, rubber modified copolymer resin, the workability is lowered and the deflection temperature under heat is lowered remarkably. If less than 10 parts of the chlorinated polyethylene is incorporated therein, the non-dripping property at the time of burning cannot be obtained and sometimes the desired fire resistant property cannot be obtained.

In addition to the above described two components, various conventional additives such as thermal stabilizers, antioxidants, lubricants and coloring matters can also be incorporated in the composition, as necessary or desired.

The mixing does not require any special mixing means. Conventional mixing devices, for example, heated rolls, Banbury mixers or extruders can be used.

DETAILED DESCRIPTION OF THE INVENTION

The present invention will be further described in greater detail by reference to the following illustrative examples.

In the examples, the burning property was measured according to the method of Subject No. 94 established by Underwriters Laboratory, U.S.A. in 1959 (hereinafter referred to as UL Standard - No. 94).

This method is as follows:

A test piece of 1/16 inch thickness, ½ inch width and 6 inch length is fixed so that its longer axis is vertical. A Bunsen burner (city gas) of ⅜ inch caliber is set to generate a bluish white flame of ¾ inch length. ⅜ Inch of the flame is contacted with the lower end of the test piece for 10 seconds. If the flame of the test piece is extinguished within 30 seconds after removal of the burner, the test piece is contacted again with the flame of the burner for 10 seconds. The burner is removed again. Test pieces in which the flame of the test piece is extinguished within 30 seconds are called "self-extinguishing". Among the self-extinguishing samples, those from which small molten drops do not fall during the burning are classified as belonging to "self-extinguishing group I (SE-I)" that cause no "burning drips" and those from which small molten drops do fall during the burning belong to "self-extinguishing group II (SE-II)" that cause "burning drips".

The test pieces for the burning test were prepared by shaping pressed sheets from the resin by using a hydraulic press (185°C/15 minutes; gauge pressure 100 kg/cm$^2$) and cutting the sheet into pieces of the above mentioned size.

EXAMPLE 1

| | |
|---|---|
| 2,4,6-Tribromophenyl methacrylate | 25 parts |
| Styrene | 55 |
| Acrylonitrile | 20 |
| Styrene-butadiene rubber | 10 |
| (Solprene 1204; A product of AA Chemical Co.) | |
| Benzoyl peroxide | 0.15 |
| Dicumyl peroxide | 0.1 |
| Tert. dodecylmercaptan | 0.2 |

The above composition was charged into a closed reaction vessel provided with a stirrer. After the rubber component had been dissolved completely, the temperature was raised to 70°C and bulk polymerization was carried out with stirring for 4 hours.

An aqueous dispersion comprising a mixture of 200 parts of water, 10 parts of magnesium hydroxide and 0.05 part of sodium lauryl sulfate, which had been prepared previously, was added to the reaction mixture and the whole was stirred to obtain a suspension. Then, the temperature was raised to 120°C and suspension polymerization was carried out for 5 hours. Thereafter, the reaction mixture was cooled to room temperature and the dispersing agent was decomposed with hydrochloric acid. The resulting polymer particles were washed with water and dried. This procedure is a conventional bulk-suspension two stage polymerization.

100 Parts of ABS resin (modified by containing 2,4,6-tribromophenyl methacrylate) thus obtained, 10 parts of chlorinated polyethylene consisting of high density polyethylene containing 39.5 percent of chlorine homogeneously, and 1.8 parts of dibutyltin maleate as stabilizer, were blended in a ribbon blender to obtain a homogeneous mixture. The mixture was shaped into pellets with an extruder (220°C) and test pieces were prepared therefrom by using an injection molding machine (210°C, gauge pressure 80 kg/cm$^2$) and a hydraulic press. The physical properties of the test pieces were determined.

In comparative Example 1, the modified ABS resin was prepared as in Example 1 but it was not blended with chlorinated polyethylene. It was shaped into pellets with an extruder (220°C) and test pieces were prepared therefrom under the same conditions as in Example 1. The physical properties of the test pieces were determined.

The results are shown in Table 1.

Table 1

| | Example 1 | Comparative Example 1 | Test Method |
|---|---|---|---|
| Tensile strength (kg/cm$^2$) | 492 | 510 | ASTM D-638 |
| Izod impact strength (with notch, kg·cm/cm$^2$) | 11.7 | 10.8 | ASTM D-256 |
| Deflection temperature under heat (°C) | 81 | 84 | ASTM D-648 (load 18.56 kg/cm$^2$) |
| Burning property | SE-I | SE-II | UL Standard No. 94 |

In both Example 1 and Comparative Example 1, neither coloring of the resin owing to decomposition nor generation of decomposed gas was observed during the molding procedure.

EXAMPLE 2

| | |
|---|---|
| 2,4,6-Tribromophenyl acrylate | 30 parts |
| Styrene | 45 |
| Acrylonitrile | 25 |
| Polybutadiene (Nippol Lx iii; a product of Nihon Zeon Co.) | 20 |
| Cumene hydroperoxide | 1.0 |
| Tert.-dodecylmercaptan | 0.2 |
| Ferrous Sulfate | 0.013 |
| Sodium pyrophosphate | 0.67 |
| Dextrose | 1.33 |
| Disproportionated sodium rhodinate | 3.0 |
| Naphthalenesulfonic acid/ formaldehyde condensate | 0.23 |
| Water | 200 |

The above composition was charged into a reaction vessel provided with a stirring device. After nitrogen-replacement in the reaction vessel, the temperature was raised to 60°C, and emulsion polymerization was carried out for 8 hours. The reaction product was coagulated with acid, washed with water and dried. 100 Parts of the resulting ABS-type resin (modified by 2,4,6-tribromophenyl acrylate) in the form of fine powder were blended with 15 parts of chlorinated polyethylene having a chlorine content of 39.5 percent, and 1.8 parts of dibutyltin maleate, in a ribbon blender in the same manner as in Example 1 to obtain a homogeneous mixture. The mixture was shaped into pellets by using an extruder, and test pieces were prepared from the pellets by using an injection molding machine and a hydraulic press. Physical properties of the test pieces were determined.

In comparative Example 2, the modified ABS resin prepared in Example 2, but not blended with chlorinated polyethylene, was shaped into pellets by using an extruder and test pieces were prepared from the pellets. Physical properties of the test pieces were determined.

The results are shown in Table 2.

Table 2

| | Example 2 | Comparative Example 2 |
|---|---|---|
| Tensile strength (kg/cm$^2$) | 334 | 352 |
| Izod impact strength (with notch, kg·cm/cm$^2$) | 21.3 | 19.4 |
| Deflection temperature under heat (°C) | 78 | 81 |
| Burning property | SE-I | SE-II |

EXAMPLE 3

| | |
|---|---|
| 2,4,6-Tribromophenyl methacrylate | 40 parts |
| Styrene | 45 |
| Acrylonitrile | 15 |
| Lauroyl peroxide | 0.4 |
| Tert.-dodecyl mercaptan | 0.1 |

The above composition was charged into a reaction vessel provided with a stirring device. An aqueous dispersion comprising 100 parts of water, 5 parts of magnesium hydroxide and 0.03 part of sodium laruyl sulfate was added to the composition and the whole was stirred to obtain a suspension. Then, the temperature was raised to 70°C and suspension polymerization was carried out for 10 hours. Thereafter, the reaction mixture was cooled to room temperature and the dispersing agent was decomposed with hydrochloric acid. The resulting polymer particles were washed with water and dried.

50 Parts of AS type resin (modified by 2,4,6-tribromophenyl methacrylate) thus obtained, 50 parts of ABS resin having graft degree of 30 percent, a styrene content of 65.2 percent, an acrylonitrile content of 21.8% and styrene-butadiene rubber content of 13 percent, 10 parts of the chlorinated polyethylene used in Example 1 and 1.8 parts of dibutyltin maleate were blended together in a ribbon blender to obtain a homogeneous mixture. The mixture was shaped into pellets by using an extruder, and test pieces were prepared from the pellets by using an injection molding machine and a hydraulic press. Physical properties of the test pieces were determined.

The results are shown in Table 3 together with the results of Example 4.

EXAMPLE 4

The final composition was prepared under the same conditions as in Example 3 in the same manner as in Example 3 except that 2,4,6-tribromophenyl methacrylate was replaced by 2,3,5,6-tetrabromo-4-methylphenyl methacrylate. Test pieces were prepared as in Example 3 and the physical properties of the product were determined. The results are shown in Table 3.

Table 3

| | Example 3 | Example 4 |
|---|---|---|
| Tensile strength (kg/cm$^2$) | 428 | 541 |
| Izod impact strength (with notch, kg·cm/cm$^2$) | 10.3 | 8.9 |
| Deflection temperature under heat (°C) | 81 | 79 |
| Burning property | SE-I | SE-I |

In both Examples 3 and 4, coloring of resin due to decomposition was not observed.

In comparison examples to both Examples 3 and 4, the burning property of each composition (but not containing chlorinated polyethylene) was SE-II.

EXAMPLE 5

| | |
|---|---|
| 2,4,6-Tribromophenyl methacrylate | 20 parts |
| Styrene | 80 |
| Polybutadiene (diene NF 35A; a product of Asahi Kasei Co.) | 7 |
| Benzoyl peroxide | 0.2 |
| Dicumyl peroxide | 0.07 |

The above composition was charged in a closed reaction vessel provided with a stirring device. After the rubber component had been dissolved completely, the temperature was raised to 85°C and bulk polymerization was carried out under stirring for 3.5 hours. An aqueous dispersing agent comprising a mixture of 100 parts of water, 5 parts of magnesium hydroxide and 0.05 part of sodium laruyl sulfate which had been prepared previously, was added to the reaction mixture, and the whole was stirred to obtain a suspension. Thereafter, suspension polymerization was effected at 120°C for 5 hours and then at 130°C for 3 hours. The reaction mixture was cooled to room temperature and the dispersing agent was decomposed with hydrochloric acid. The resulting polymer particles were washed with water and dried.

100 Parts of HI polystyrene resin (modified by 2,4,6-tribromophenyl methacrylate) thus obtained were mixed with 10 parts of chlorinated polyethylene and 1.8 parts of dibutyltin maleate used in Example 1 in a ribbon blender to obtain a homogeneous mixture. The mixture was shaped into pellets by using an extruder (200°C) and test pieces were prepared from the pellets by using an injection molding machine (190°C) and a hydraulic press (180°C). Physical properties of the test pieces were determined.

The results were as shown below.

| | |
|---|---|
| Tensile strength (kg/cm$^2$) | 265 |
| Izod impact strength (with notch, kg·cm/cm$^2$) | 9.6 |
| Deflection temperature under heat (°C) | 77 |
| Burning property | SE-I |

In a comparison example, the burning property of the same composition (but not containing chlorinated polyethylene) was SE-II.

The embodiments of the invention in which an exclusive property or privilege is claimed are defined as follows:

1. A flame-retardant, impact-resistant resin composition, consisting essentially of
   A. rubber-modified copolymer, containing admixed therein,
   B. from 10 to 20 parts by weight, per 100 parts by weight of copolymer A, of chlorinated polyethylene, chlorinated ethylene-propylene copolymer, chlorinated ethylene-butene copolymer or chlorosulfonated polyethylene, having a chlorine content of from 25 to 45 percent by weight, said copolymer A comprising (a) from 3 to 30 percent by weight of rubber component and (b) from 97 to 70 percent by weight of resin component, said resin component (b) consisting of
   1. at least 40 percent by weight of resin component (b) of aromatic monoalkenyl compound,
   2. from 15 to 35 percent by weight of resin component (b) of a compound, or mixture of compounds of the formula

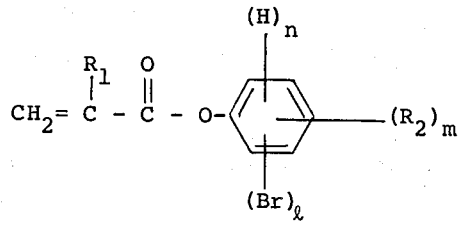

wherein
   $R_1$ is H or $CH_3$,
   $R_2$ is alkyl of one to 4 carbon atoms, or chlorine,
   $l$ is an integer of 2, 3, 4 or 5,
   $m$ and $n$ each is an integer of 0, 1, 2 or 3 provided that the sum of $l+m+n$ is 5;
   3. the balance of ethylenically unsaturated monomer copolymerizable with said aromatic monoalkenyl compound.

2. A composition of claim 1, in which said material B has a molecular weight above 10,000.

3. A composition of claim 1, in which said ingredient A(b) (2) is 2,4,6-tribromophenyl methacrylate.

4. A composition of claim 1, in which said ingredient A(b) (2) is 2,4,6-tribromophenyl acrylate.

5. A composition of claim 1, in which said ingredient A(b) (2) is 2,3,5,6-tetrabromo-4-methylphenyl methacrylate.

* * * * *

UNITED STATES PATENT OFFICE
CERTIFICATE OF CORRECTION

Patent No. 3 883 615  Dated May 13, 1975

Inventor(s) Teizo Kudo, Shinji Tokuhara and Keiichi Ohata

It is certified that error appears in the above-identified patent and that said Letters Patent are hereby corrected as shown below:

On the first page, under "Inventors:" please change the third inventor's last name from "Chata" to ---Ohata---.

Signed and Sealed this second Day of September 1975

[SEAL]

Attest:

RUTH C. MASON  
*Attesting Officer*

C. MARSHALL DANN  
*Commissioner of Patents and Trademarks*